United States Patent [19]

Nalesnik et al.

[11] Patent Number: 5,160,446
[45] Date of Patent: Nov. 3, 1992

[54] DISPERSANT, VI IMPROVER AND ANTIOXIDANT ADDITIVE, AND LUBRICATING OIL COMPOSITION CONTAINING SAME

[75] Inventors: Theodore E. Nalesnik, Wappingers Falls; Maria M. Kapuscinski, Carmel, both of N.Y.

[73] Assignee: Texaco Inc., White Plains, N.Y.

[21] Appl. No.: 704,163

[22] Filed: May 22, 1991

[51] Int. Cl.$^5$ ............... C10M 149/06; C08F 210/16; C08F 220/52
[52] U.S. Cl. ............... 252/51.5 A; 252/401; 525/259; 525/285; 525/301; 525/331.7; 525/331.9; 525/333.6; 525/377
[58] Field of Search ............... 252/51.5 A, 401; 525/259, 285, 301, 331.7, 333.6, 377

[56] References Cited

U.S. PATENT DOCUMENTS

| | | | |
|---|---|---|---|
| 4,160,739 | 7/1979 | Stambaugh et al. | 525/301 |
| 4,219,432 | 8/1980 | Girgenti et al. | 525/301 |
| 4,557,847 | 12/1985 | Gutierrez et al. | 525/331.7 |
| 4,735,736 | 4/1988 | Chung | 252/51.5 A |
| 4,948,524 | 8/1990 | Kapuscinski et al. | 525/377 |
| 4,973,412 | 11/1990 | Migdal et al. | 252/51.5 A |
| 5,112,508 | 5/1992 | DeRosa et al. | 525/301 |

*Primary Examiner*—Ellen McAvoy
*Attorney, Agent, or Firm*—Robert A. Kulason; Robert B. Burns; James J. O'Loughlin

[57] ABSTRACT

An additive reaction product prepared by the steps comprising reacting a copolymer selected from the group consisting of ethylene copolymers prepared from ethylene and at least one $C_3$–$C_{10}$ alpha-monoolefin and, optionally, a polyene selected fron non-conjugated dienes and trienes comprising from about 15 to 80 mole percent of ethylene, from about 20 to 85 mole percent of said $C_3$–$C_{10}$ alpha-monoolefin, and from about 0 to 15 mole percent of said polyene and block copolymers prepared from styrene and a diene monomer having from 4 to 6 carbon atoms, said copolymer being a number average molecular weight ranging from about 25,000 to 300,000, with at least one olefinic carboxylic acid acylating agent to form one or more acylating reaction intermediates characterized by having a carboxylic acid acylating function with their structure; reacting said reaction intermediate in with an unsaturated hydrocarbyl amine to form an imide reaction product; and reacting said imide reaction product with a nitroso compound, and a lubricating oil compositon containing same.

22 Claims, No Drawings

DISPERSANT, VI IMPROVER AND ANTIOXIDANT ADDITIVE, AND LUBRICATING OIL COMPOSITION CONTAINING SAME

BACKGROUND OF THE INVENTION

This invention relates to a novel multifunctional lubricant additive which is a VI improver, a dispersant, and an antioxidant additive when employed in a lubricating oil composition.

DISCLOSURE STATEMENT

The art contains many disclosures on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3-C_{28}$ alpha olefin solution grafted with an ethylenically-unsaturated carboxylic acid material followed by a reaction with a polyfunctional material reactive with carboxyl groups, such as a polyamine, a polyol, or a hydroxyamine, which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S Pat. No. 4,320,019 discloses a multipurpose lubricating additive prepared by the reaction of an interpolymer of ethylene and a $C_3-C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. Pat. No. 4,948,524 discloses a lubricant additive and a lubricating oil composition wherein a nitrosodiphenylamine is directly grafted onto an ethylene-propylene copolymer in the presence of a free-radical initiator.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,320,019, 4,340,689, 4,357,250, 4,382,007 and 4,948,524 are incorporated herein by reference.

An object of this invention is to provide a novel derivatized graft copolymer composition.

Another object of the invention is to provide a multifunctional lubricant additive effective for imparting viscosity index, dispersancy and antioxidant properties to a lubricating oil composition.

A further object is to provide a novel lubricating oil composition containing the graft copolymer additive of the invention, as well as to provide concentrates of the novel additive of invention.

SUMMARY OF THE INVENTION

The novel reaction product of the invention comprises a copolymer selected from the group consisting of an ethylene copolymer or terpolymer of a $C_3-C_{10}$ alpha-monoolefin and, optionally, a non-conjugated diene or triene or a block copolymer prepared from styrene and a diene monomer having from 4 to 6 carbon atoms on which has been grafted an ethylenically unsaturated carboxylic function which is then further derivatized with an unsaturated aliphatic amine having from 3 to 24 carbon atoms to form an imide reaction product and further reacting the imide reaction product with a nitroso compound represented by the formula $R-N=O$, in which R is an aromatic compound having from 6 to 20 carbon atoms.

The novel lubricant of the invention comprises an oil of lubricating viscosity and an effective amount of the novel reaction product. The lubricating oil will be characterized by having viscosity index improver and dispersancy, antioxidant properties.

Concentrates of the reaction product of the invention are also contemplated.

DETAILED DESCRIPTION OF THE INVENTION

The copolymer substrate employed in the novel additive of the invention is selected from the group consisting of ethylene copolymers and terpolymers or a block copolymer prepared from styrene and a diene monomer having from 4 to 6 carbon atoms.

In general, ethylene copolymers may be prepared from ethylene and propylene, or it may be prepared from ethylene and a higher olefin within the range of $C_3-C_{10}$ alpha-monoolefins. More complex polymer substrates, often designated as interpolymers, may be prepared using a third component. The third component generally used to prepare an interpolymer substrate is a polyene monomer selected from non-conjugated dienes and trienes. The con-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehyro-isodicyclopentadiene, and 2-(2-methylene-4-methyl-3-pentenyl)[2.2.1]bicyclo-5-heptene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler-type catalyst. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus, such as benzene, toluene, and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40-45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha-monoolefin copolymers may consist of from about 15 to 80 mole percent ethylene and from about 20 to 85 mole percent propylene or higher monoolefin, with the preferred mole ratios being from about 25 to 75 mole percent ethylene and from about 25 to 75 mole percent of a $C_3$-$C_{10}$ alpha-monoolefin, with the most preferred proportions being from 25 to 55 mole percent ethylene and 45 to 75 mole percent propylene.

Terpolymer variations of the foregoing polymers may contain from about 0.1 to 10 mole percent of a non-conjugated diene or triene.

The ethylene copolymer substrate, that is, the ethylene copolymer or terpolymer, is an oil-soluble, substantially linear, rubbery material having a number average molecular weight ranging from about 25,000 to 300,000, with a preferred molecular weight range of 50,000 to 250,000, and a most preferred range from about 75,000 to 150,000.

The block copolymer substrate employed in the novel additive of the invention may be prepared from styrene, ethylene and butadiene to produce a styrene-ethylenebutylene-styrene (S-EB-S) block copolymer having an S-EB-S molecular weight ratio of 1:10:1 to 1:3:1. Block copolymers may also be prepared from styrene and a diene monomer having from 4 to 6 carbon atoms, such as butadiene, isoprene and pentadienes.

The polymerization reaction to form the block copolymer substrate may be carried out in the presence of a catalyst in a solvent medium. The polymerization solvent may be any suitable inert organic solvent that is liquid under reaction conditions for solution polymerization of olefins which is generally conducted in the presence of a Ziegler or a Ziegler-Natta type catalyst. Examples of satisfactory hydrocarbon solvent include straight chain paraffins having from 5 to 8 carbon atoms, with hexane or cyclohexane being preferred. Aromatic hydrocarbons, preferably aromatic hydrocarbons having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

The polymeric materials used are substantially linear hydrocarbon block copolymers. It is more specifically a hydrogenated S-EB-S block copolymer having a styrene-rubber ratio approximately 0.1 to 0.5. The monoalkylenyl aromatic hydrocarbon (2,000-115,000 average molecular weight) contained in the rubber comprises 5 to 95 percent of the copolymer. The co-block component, a conjugated diene, viz., isoprene or butadiene, is the second component of this rubber (20,000-450,000 average molecular weight). The material that is ultimately generated has a styrene rubber ratio of approximately 0.1 to 0.5. Upon selective hydrogenation using Raney Nickel or Group VIII metals, such as Pt or Pd >50% of the initial unsaturation contained in the monoalkylenyl aromatic hydrocarbon remains and <10% of the initial unsaturation contained in the butadiene remains. This has the advantage of permitting subsequent melt-mixing of graftable monomer or monomers through an extruder and thermally initiating the free radical graft reaction with or without a free radical thermal initiator.

Di-, tri- or multiblock copolymers are synthesized using anionic initiators, typically, but not restricted to, Ziegler-Natta catalysis materials. In those cases where Ziegler-Natta materials are used, transition metal salts are reacted with Group Ia, IIa, or IIIa metal halides under anhydrous and oxygen-free conditions in a variety of inert solvents. This method is very well known and described in the art. Other anionic catalysis are known, including using Group Ia metals directly. This method is also well known and thereto described in the art.

The terms "polymer" and "copolymer" are used generically to encompass ethylene copolymers, terpolymers or interpolymers. These materials may contain minor amounts of other olefinic monomers as long as their basic characteristics are not materially changed.

Polymer substrates or interpolymers are available commercially. Particularly useful are those containing from about 40 to about 60 mole percent ethylene units, about 60 to about 40 mole percent propylene units. Examples are "Ortholeum 2052" and "PL-1256" available from E. I. dupont de Nemours and Co. The former is a terpolymer containing about 48 mole percent ethylene units, 48 mole percent propylene units, and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

Polymeric materials containing hydrogenated block segments of hydrogenated styrene-ethylenebutylene-styrene are also available commercially and are sold under the trade name "Kraton".

An ethylenically unsaturated carboxylic acid material is next grafted onto the prescribed copolymer backbone. These materials, which are attached to the polymer, contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic acid materials include chlormaleic anhydride, itaconic anhydride, or the corresponding dicarboxylic acids, such as maleic acid, fumaric acid, and their monoesters.

The ethylenically unsaturated carboxylic acid material may be grafted onto the polymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents, such as benzene, is a preferred method. It is carried out at an elevated temperature in the range of about 100° C. to 250° C., preferably 120° C. to 190° C., and more preferably at 150° C. to 180° C., e.g., above 160° C., in a solvent, preferably a mineral lubricating oil solution containing, e.g., 1 to 50, preferably 5 to 30 weight percent, based on the initial total oil solution, of the ethylene polymer and preferably under an inert environment.

The free-radical initiators which may be used are peroxides, hydroperoxides, and azo compounds, and preferably those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiarybutyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten rubber using rubber masticating or shearing equipment. The temperature of the molten material in this process may range from about 150° C. to 400° C.

The reaction between the polymer and the ethylenically unsaturated carboxylic acid material produces a reaction intermediate characterized by having a carboxylic acid acylating function within its structure.

The polymer intermediate possessing carboxylic acid acylating functions is reacted with an unsaturated hydrocarbyl amine represented by the formula:

RNH$_2$, in which R is an unsaturated hydrocarbyl radical having from 3 to 24 carbon atoms. A preferred range for R is from 4 to 16 carbon atoms. R may be an aliphatic or a cycloaliphatic unsaturated hydrocarbon radical.

Typical unsaturated hydrocarbyl amines which can be employed include oleylamine, allylamine and furylamine.

The reaction between the acylated polymer and the unsaturated hydrocarbyl amine is conducted at an elevated temperature under an inert atmosphere. In a preferred method, an oil solution of the grafted copolymer is heated to about 160° F. while being maintained under a nitrogen blanket. The unsaturated hydrocarbyl amine is slowly added to the reaction mixture over a period of an hour or more. Upon completion of this reaction, the reaction product is cooled and filtered. This reaction product will be characterized by having a substantial amount of an imide structure as shown by Infrared and may be referred to as an imide or a succinimide reaction product.

The imide reaction product is finally reacted with a nitroso compound. The nitroso compound which may be employed is represented by the formula:

R—N=O, in which R is an aromatic hydrocarbon radical having from 12 to 20 carbon atoms which may include an aromatic amine radical. A specific class of nitroso compounds which can be employed are the nitrosodiphenylamines represented by the formula:

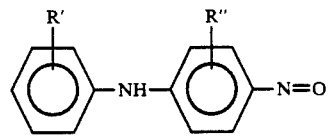

in which R' and R" represent hydrogen or an organic radical having from 1 to 10 carbon atoms which may contain nitrogen, oxygen, or sulfur atoms. A preferred nitrosodiphenylamine compound is one in which R' and R" each represent hydrogen or an aliphatic hydrocarbon radical having from 1 to 5 carbon atoms. Examples of suitable nitrosodiphenylamine compounds include 4-nitrosodiphenylamine, 3-nitrosodiphenylamine, and 4-nitroso-2,3'-dimethyl-diphenylamine, and 4-nitrosophenylnaphthylamine.

The following examples illustrate the practice of this invention:

EXAMPLE I

EPM-MA/Oleylamine Succinimide 36 grams of a solid maleic anhydride graft ethylene-propylene polymer (EPM-MA) (rubber) in which the polymer substrate consists of about 60 mole percent ethylene and 40 mole percent propylene having a number average molecular weight of 80,000 on which had been grafted 1.0 percent of maleic anhydride was dissolved in 264 grams of solvent neutral oil at 160° C. with stirring while the mixture was maintained under a nitrogen blanket. After the rubber polymer had dissolved in the oil, mixing was continued for an additional one and one-half hours at 160° C.

1.0 gram of oleylamine was slowly added to the mixture. The reaction was continued over a period of two hours while maintained under a nitrogen blanket and at a temperature of 160° C. The imidized reaction product

EXAMPLE II

EPM-Oleyl Succinimide/Nitrosodiphenylamine

A reaction product similar to Example I was prepared using 72 grams of the EPM-maleic anhydride, 528 grams of the solvent neutral oil, and 2 grams of oleylamine following the identical procedure used in Example I.

The imide reaction product prepared was reacted with 1.8 grams of nitrosodiphenylamine. The nitrosodiphenylamine was added slowly to the reaction mixture, which was maintained at 160° C. under nitrogen for a period of 1.5 hours. The final reaction product was cooled to 80° C. and filtered through a 100-mesh screen.

EXAMPLE III

| Ethylene-Propylene Monomer-Maleic Anhydride/Allylamine | |
|---|---|
| Materials | Amount |
| EPM-MA | 60 gr |
| SNO-100 | 440 gr |
| Allylamine | 1.0 gr |
| N-hexane | 10 ml |

60 grams of EPM-MA rubber were dissolved in oil at 160° C. under a nitrogen blanket as outlined in Example I. The rubber oil solution was charged to a 600-ml Parr pressure reactor using a glass liner. The reactor was purged twice at 200 psi with nitrogen before filling the reactor with 200 psi nitrogen for the reaction. The temperature was raised to 160° C. with stirring. 1.0 gram of allylamine, predissolved in 5 ml hexane, was charged to the reactor and the imidization reaction continued for two hours at 160° C. The reaction was cooled to room temperature, the product isolated and filtered through a 100-mesh screen. Traces of hexane were removed under vacuum at 140° C.

EXAMPLE IV

Ethylene-Propylene Monomer-Allyl Succinimides/Nitrosodiphenylamine 212 grams of an EPM-allyl succinimide reaction product of Example III were placed in a reactor under a nitrogen blanket. The temperature in the reaction vessel was raised to 140° C. after which 0.72 grams of nitrosodiphehylamine were added to the reaction mixture. The reaction was continued at 140° C. for two hours, following which the reaction product was cooled to 80° C. and screen filtered through a 100-mesh screen.

EXAMPLE V

Ethylene-Propylene Monomer-Maleic Anhydride/Furfurylamine 146 grams of an ethylene-propylene monomer-maleic anhydride polymer rubber grafted with maleic anhydride similar to Example I were dissolved in 1,054 grams of solvent neutral oil under a nitrogen blanketed reactor at 160° C. as described in Example I. 1.81 grams of furfurylamine were slowly added and the reaction continued for two hours at 160° C. The reaction product was then cooled to 100° C. and filtered through a 100-mesh screen.

EXAMPLE VI

EPM-Furfuryl Succinimide/Nitrosodiphenylamine 73 grams of an ethylene-propylene rubber polymer grafted with maleic anhydride similar to that of Example I were dissolved in 527 grams of a solvent neutral oil in a nitrogen blanketed reactor at 160° C. 1.35 grams of furfurylamine were then slowly added, and this reaction was continued for about two hours at 160° C. to complete the imide reaction. 1.8 grams of nitrosodiphenylamine were then slowly added to the reaction mixture, and the reaction continued at 160° C. for 1.5 hours. The final reaction product was cooled to 80° C. and then filtered through a 100-mesh screen.

The novel graft and derivatized polymer of the invention is useful as an additive for lubricating oils. They are multifunctional additives for lubricants being effective to provide dispersancy, viscosity index improvement and antioxidant properties to lubricating oils. They can be employed in a variety of oils of lubricating viscosity, including natural and synthetic lubricating oils and mixtures thereof. The novel additives can be employed in crankcase lubricating oils for spark-ignited and compression-ignited internal combustion engines. The compositions can also be used in gas engines or turbines, automatic transmission fluids, gear lubricants, metal-working lubricants, hydraulic fluids, and other lubricating oil and grease compositions. Their use in motor fuel compositions is also contemplated.

The base oil may be a natural oil, including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A preferred concentration range for the additive is from about 1 to 15 weight percent based on the total weight of the oil composition.

Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants and anti-wear agents.

The following tests were conducted on the novel reaction products of the invention to evaluate the oxidation stability and the dispersancy effectiveness of these products in comparison to the non-nitroso reaction products.

Oxidation Stability

The oxidation stability or antioxidant activity of the additive was examined in a Bench Oxidation Test (BOT). In this test, the sample is diluted with SNO-130 oil to form 8.6 wt. % VI improver solution (1.0-1.5 wt. % polymer solution). The mixture is heated with stirring and air agitation. Samples are withdrawn periodically for analysis by differential infrared analysis (DIR) to observe changes in the intensity of the carbonyl group vibration band at 1710 cm$^{-1}$. Higher carbonyl group intensity indicates a lower thermal Oxidation Index (OI) as shown by a change in the intensity of the carbonyl vibration band at 1710 cm$^{-1}$ after 144 hours of oxidation. A lower rating indicates better thermal-oxidative stability of the sample.

Dispersancy

The sample is blended into a formulated oil not containing dispersant to form 10 wt. % VI improver solution. That blend is tested for dispersancy in the Bench VC Test.

In that test, dispersancy is compared to that of three reference oils (which give excellent, good or fair results in the test), which are tested along with the experimental sample. The numerical value of a test result decreases with an increase in dispersant activity. A value of 90 indicates that a sample does not provide any dispersancy.

Results

The dispersancy and antioxidation evaluation results are listed in Table I. The sample numbers are related to the preparation example numbers. Preparations of all EPM-succinimides were confirmed by I.R. analysis (succinimide band at 1702 cm$^{-1}$) of isolated and purified polymer from oil solution. The derivatization of unsaturated polymer bound succinimides with nitrosodiphenylamine was also confirmed by I.R. analysis (aromatic band at 1600 cm$^{-1}$) of isolated and purified polymer from oil solution. As shown in Table I, all EPM-succinimide nitroso amine derivatives showed improved antioxidation properties over parent EPM-succinimide. In the case of the oleyl succinimide, an improvement in dispersancy was also observed.

TABLE I

Bench Dispersancy and Oxidation Results

| Preparation Not | | Bench Sludge Test | Bench Oxidation Test |
|---|---|---|---|
| Example | | | |
| I | (oleylamine) (comparison) | 93 | 46 |
| II | (oleylamine/nitrosoamine) | 46 | 3 |
| III | (allyl/amine) (comparison) | 25 | 46 |
| IV | (allylamine/nitrosoamine) | 31 | 3 |
| V | (furfurylamine) (comparison) | 32 | 45 |
| VI | (furfurylamine/nitrosoamine) | 32 | 12 |
| EPM (1) | | >90 | 16 |
| EPM-MP (1) | | >80 | 27 |

12 wt. % in SNO-100

The results in Table I demonstrate that EPM-unsaturated succinimides derivatized with an antioxidant nitroso compound produces a multifunctional VI improver with excellent dispersancy and outstanding antioxidant properties.

What is claimed is:

1. An additive composition prepared by the steps comprising:
(A) reacting a copolymer, selected from the group consisting of ethylene copolymers prepared from ethylene and at least one C$_3$-C$_{10}$ alpha-monoolefin and, optionally, a non-conjugated diene and triene, and block copolymers prepared from styrene and a diene monomer having from 4 to 6 carbon atoms, said copolymer having a number average molecular weight ranging from about 25,000 to 300,000, with at least one olefinic carboxylic acid acylating agent to form one or more acylating reaction intermediates characterized by having a carboxylic acid acylating function in their structure;

(B) reacting said reaction intermediate in (A) with an unsaturated hydrocarbyl amine represented by the formula:

RNH$_2$ in which R is an unsaturated hydrocarbyl radical having from 3 to 24 carbon atoms to form an imide reaction product; and (C) reacting said reaction product in (B) with a nitroso compound represented by the formula:

R—N=O in which R is an aromatic hydrocarbon radical or aromatic amine radical having from 12 to 20 carbon atoms.

2. A composition according to claim 1 in which said copolymer has a number average molecular weight from about 50,000 to 250,000.

3. A composition according to claim 1 in which said polymer has a number average molecular weight from about 75,000 to 50,000.

4. A composition according to claim 1 in which said polymer comprises from about 25 to 75 mole percent ethylene and from about 25 to 75 mole percent of a C$_3$-C$_8$ alpha-monoolefin.

5. A composition according to claim 1 in which said polymer comprises from about 25 to 55 mole percent ethylene and from about 45 to 75 mole percent of propylene.

6. A composition according to claim 4 which contains from about 0.1 to 10 mole percent of a polyene.

7. A composition according to claim 1 in which said copolymer is a block copolymer comprising styrene and a diene monomer.

8. A composition according to claim 7 in which said diene monomer is selected from the group consisting of butadienes, isoprene and pentadienes.

9. A composition according to claim 1 in which said olefinic carboxylic acid acylating agent is maleic anhydride.

10. A composition according to claim 1 in which said olefinic carboxylic acid acylating agent is itaconic anhydride.

11. A composition according to claim 1 in which said amine has from 3 to 24 carbon atoms.

12. A composition according to claim 9 in which said amine is oleylamine.

13. A composition according to claim 9 in which said amine is furfurylamine.

14. A composition according to claim 11 in which said amine is allylamine.

15. A composition according to claim 1 in which said nitroso compound is represented by the formula:

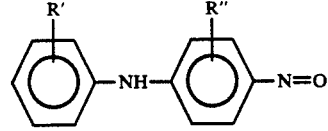

in which R' and R" represent hydrogen or an organic radical having from 1 to 10 carbon atoms which may contain nitrogen, oxygen, or sulfur atoms.

16. A composition according to claim 15 in which said nitroso compound is 4-nitrosodiphenylamine.

17. A composition according to claim 15 in which said nitroso compound is 4-nitrosophenylnaphthylamine.

18. A composition according to claim 15 in which said nitroso compound is 4-nitroso-2,3'-dimethyldiphenylamine.

19. A lubricating oil composition comprising a major amount of an oil of lubricating viscosity and a minor amount effective to impart viscosity index improvement, dispersancy, and antioxidant properties to said oil of an additive reaction product prepared by the steps comprising:

(A) reacting a copolymer, selected from the group consisting of ethylene copolymers prepared from ethylene and at least one $C_3$–$C_{10}$ alpha-monoolefin and, optionally, a non-conjugated diene and triene, and block copolymers prepared from styrene and a diene monomer having from 4 to 6 carbon atoms, said copolymer having a number average molecular weight ranging from about 25,000 to 300,000, with at least one olefinic carboxylic acid acylating agent to form one or more acylating reaction intermediates characterized by having a carboxylic acid acylating function in their structure;

(B) reacting said reaction intermediate in (A) with an unsaturated hydrocarbyl amine represented by the formula:

$RNH_2$ in which R is an unsaturated hydrocarbyl radical having from 3 to 24 carbon atoms to form an imide reaction product; and (C) reacting said reaction product in (B) with a nitroso compound represented by the formula:

$R-N=O$ in which R is an aromatic hydrocarbon radical or aromatic amine radical having from 12 to 20 carbon atoms.

20. A lubricating oil composition according to claim 19 containing from about 0.1 to 30 weight percent of said additive reaction product.

21. A lubricating oil composition according to claim 19 containing from about 1 to 15 weight percent of said additive reaction product based on the total weight of the oil composition.

22. A concentrate for a lubricating oil comprising a diluent oil of lubricant viscosity and from about 1 to 50 weight percent of the additive composition of claim 1 based on the total weight of the concentrate.

* * * * *